United States Patent
Etesse

(10) Patent No.: US 9,166,982 B1
(45) Date of Patent: Oct. 20, 2015

(54) SYSTEM AND METHOD FOR PROVIDING ACCESS TO EDUCATIONAL CONTENT IN PRIVATE BROWSING MODE

(71) Applicant: Flat World Knowledge, Inc., Washington, DC (US)

(72) Inventor: Christopher Etesse, Paeonian Springs, VA (US)

(73) Assignee: FLAT WORLD KNOWLEDGE, INC., Washington, DC (US)

( * ) Notice: Subject to any disclaimer, the term of this patent is extended or adjusted under 35 U.S.C. 154(b) by 0 days.

(21) Appl. No.: 14/329,839

(22) Filed: Jul. 11, 2014

Related U.S. Application Data

(60) Provisional application No. 61/890,151, filed on Oct. 11, 2013.

(51) Int. Cl.
H04L 29/06 (2006.01)

(52) U.S. Cl.
CPC ............ *H04L 63/10* (2013.01); *H04L 63/0421* (2013.01)

(58) Field of Classification Search
CPC ...... G06F 21/60; G06F 21/6263; H04L 67/22
USPC .......................................................... 726/26
See application file for complete search history.

(56) References Cited

U.S. PATENT DOCUMENTS

| | | | |
|---|---|---|---|
| 5,987,302 A | 11/1999 | Driscoll et al. | |
| 6,091,930 A | 7/2000 | Mortimer et al. | |
| 7,558,853 B2 | 7/2009 | Alcorn et al. | |
| 8,175,511 B1 | 5/2012 | Sordo et al. | |
| 8,347,295 B1 | 1/2013 | Robertson et al. | |
| 8,402,011 B1* | 3/2013 | Bodenhamer | 707/706 |
| 8,554,129 B2 | 10/2013 | Timbadia et al. | |
| 2002/0168621 A1 | 11/2002 | Cook et al. | |
| 2003/0180700 A1 | 9/2003 | Barry et al. | |
| 2005/0227216 A1 | 10/2005 | Gupta | |
| 2006/0014130 A1 | 1/2006 | Weinstein | |
| 2007/0134641 A1 | 6/2007 | Lieu | |
| 2008/0070219 A1 | 3/2008 | Golczewski et al. | |
| 2008/0138787 A1 | 6/2008 | Weinstein | |
| 2008/0222552 A1* | 9/2008 | Batarseh et al. | 715/776 |
| 2011/0039244 A1 | 2/2011 | Packard et al. | |
| 2011/0275049 A1 | 11/2011 | Albright | |
| 2012/0198524 A1* | 8/2012 | Celebisoy | 726/5 |
| 2012/0215578 A1 | 8/2012 | Swierz, III et al. | |
| 2012/0329026 A1 | 12/2012 | Lewolt | |
| 2012/0329027 A1 | 12/2012 | Lewolt | |

(Continued)

OTHER PUBLICATIONS

U.S. Office Action issued in U.S. Appl. No. 14/332,289, dated Nov. 7, 2014.

(Continued)

*Primary Examiner* — Harunur Rashid
(74) *Attorney, Agent, or Firm* — McDermott Will & Emery LLP

(57) ABSTRACT

A system and method are provided for providing access to educational content in a private browsing mode. A private browsing session is initiated that provides to an incognito user access to an educational account associated with a user of the educational content, wherein the educational account includes a set of stored user actions associated with the educational content. The incognito user is associated with the user. The incognito user is permitted to re-execute the set of user actions within the private browsing session without the re-executed actions being stored in the user account.

17 Claims, 9 Drawing Sheets

(56) References Cited

U.S. PATENT DOCUMENTS

| | | | |
|---|---|---|---|
| 2013/0089848 | A1 | 4/2013 | Exeter et al. |
| 2013/0130221 | A1 | 5/2013 | Kortemeyer et al. |
| 2013/0325665 | A1* | 12/2013 | Shaffer et al. ............... 705/26.61 |
| 2014/0120515 | A1 | 5/2014 | Mahmud et al. |
| 2014/0122595 | A1 | 5/2014 | Murdoch et al. |
| 2014/0193795 | A1 | 7/2014 | Tavolacci et al. |
| 2014/0356837 | A1 | 12/2014 | Kutty et al. |

OTHER PUBLICATIONS

U.S. Office Action issued in U.S. Appl. No. 14/329,851, dated Nov. 21, 2014.

U.S. Office Action issued in U.S. Appl. No. 14/328,619, dated Oct. 9, 2014.

U.S. Office Action issued in U.S. Appl. No. 14/332,210, dated Jan. 9, 2015.

Final Office Action issued in U.S. Appl. No. 14/328,619, dated Jun. 12, 2015.

Final Office Action issued in U.S. Appl. No. 14/332,289, dated Jun. 4, 2015.

Final Office Action issued in U.S. Appl. No. 14/329,851, dated Jun. 1, 2015.

\* cited by examiner

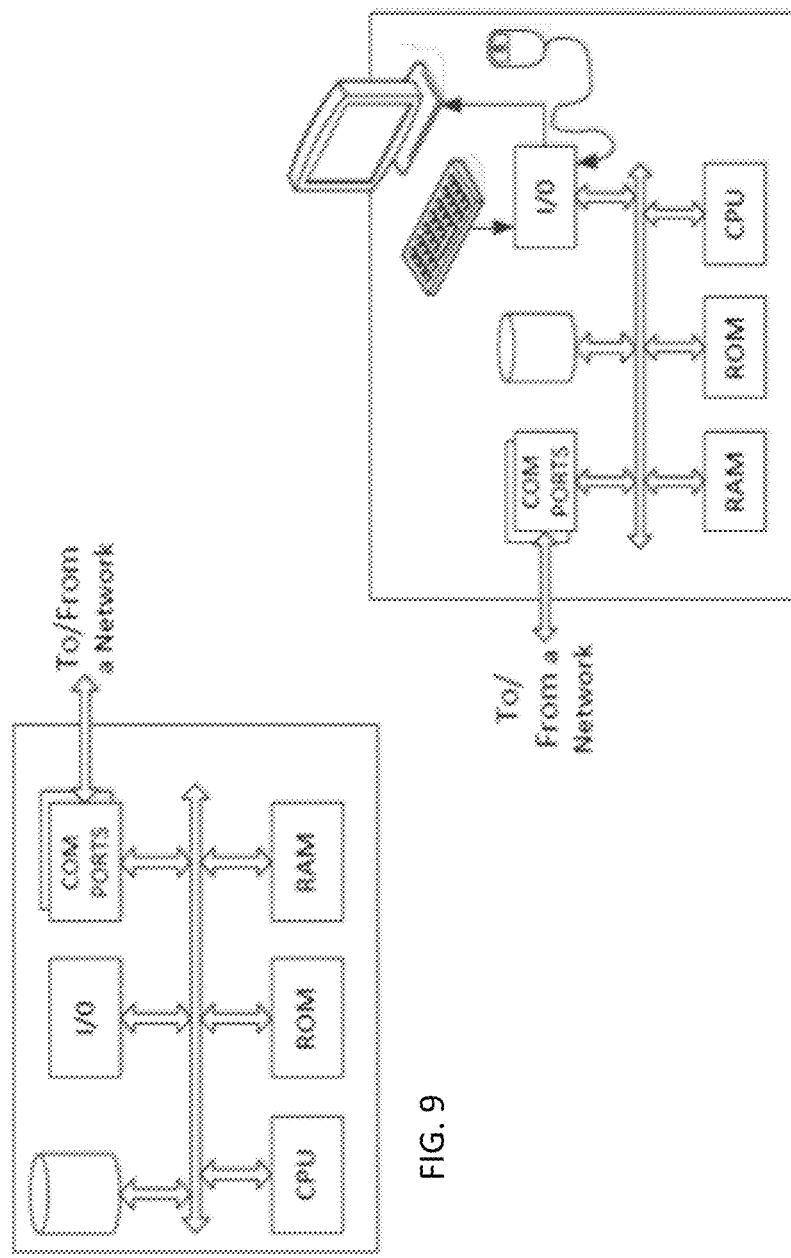

SYSTEM AND METHOD FOR PROVIDING ACCESS TO EDUCATIONAL CONTENT IN PRIVATE BROWSING MODE

RELATED APPLICATIONS AND CLAIM OF PRIORITY

This application claims the benefit of priority to U.S. Provisional Application Ser. No. 61/890,151, entitled "System and Method for Providing Educational Courses and Programs on a Mobile Computing Device" filed by Etesse et al. on Oct. 11, 2013, the entire contents of which are hereby incorporated by reference as if originally set forth herein, under 35 U.S.C. §119(e).

BACKGROUND

1. Field

The present disclosure generally relates to providing online educational courses, and particularly to providing access to educational content in a private browsing mode.

2. Description of the Related Art

Many educational institutions including colleges and universities provide many courses online in addition to offline courses. Traditionally, colleges and universities award credit for classroom hours attended, conferring degrees based on students' completion of a certain set of courses for a given number of credit hours. More recently, educational institutions provide various learning methods such as, for example, traditional credit hour learning methods in a lecture hall, traditional credit hour learning methods online, learning by tutoring (traditional or online), remote learning, etc.

SUMMARY

An exemplary embodiment of the inventive concept includes a system for providing access to educational content in a private browsing mode. The system includes a memory comprising instructions and a processor configured to execute the instructions. The instructions include various functions as follows. A private browsing session is initiated that provides to an incognito user access to an educational account associated with a user of the educational content is initiated. The educational account includes a set of stored user actions associated with the educational content. In addition, the incognito user is associated with the user. Moreover, the incognito user is permitted to re-execute the set of user actions within the private browsing session without the re-executed actions being stored in the user account.

Another exemplary embodiment of the inventive concept includes a computer-implemented method for providing access to educational content in private access mode. The computer-implemented method includes various steps as follows. A private browsing session is initiated that provides to an incognito user access to an educational account associated with a user of the educational content is initiated. The educational account includes a set of stored user actions associated with the educational content. In addition, the incognito user is associated with the user. Moreover, the incognito user is permitted to re-execute the set of user actions within the private browsing session without the re-executed actions being stored in the user account.

Another exemplary embodiment of the inventive concept includes a non-transitory computer-readable medium including instructions stored therein for providing access to educational content in a private browsing mode. The instructions when executed by a system cause the system to perform various functions as follows. A private browsing session is initiated that provides to an incognito user access to an educational account associated with a user of the educational content is initiated. The educational account includes a set of stored user actions associated with the educational content. In addition, the incognito user is associated with the user. Moreover, the incognito user is permitted to re-execute the set of user actions within the private browsing session without the re-executed actions being stored in the user account.

Other concepts relate to unique software for implementing the disclosed techniques and methodologies. A software product, in accord with this concept, includes at least one machine-readable medium and information carried by the medium. The information carried by the medium may be executable program code, one or more databases and/or information regarding various aspects of the disclosed methodologies.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

BRIEF DESCRIPTION OF THE DRAWINGS

The drawing figures depict one or more implementations in accord with the present teachings, by way of example only, not by way of limitation. In the figures, like reference numerals refer to the same or similar elements.

FIG. 9 is a simplified functional block diagram of an exemplary computer that may be configured as a host or server.

FIG. 10 is a simplified functional block diagram of an exemplary personal computer or terminal device.

DETAILED DESCRIPTION

Figure 1:
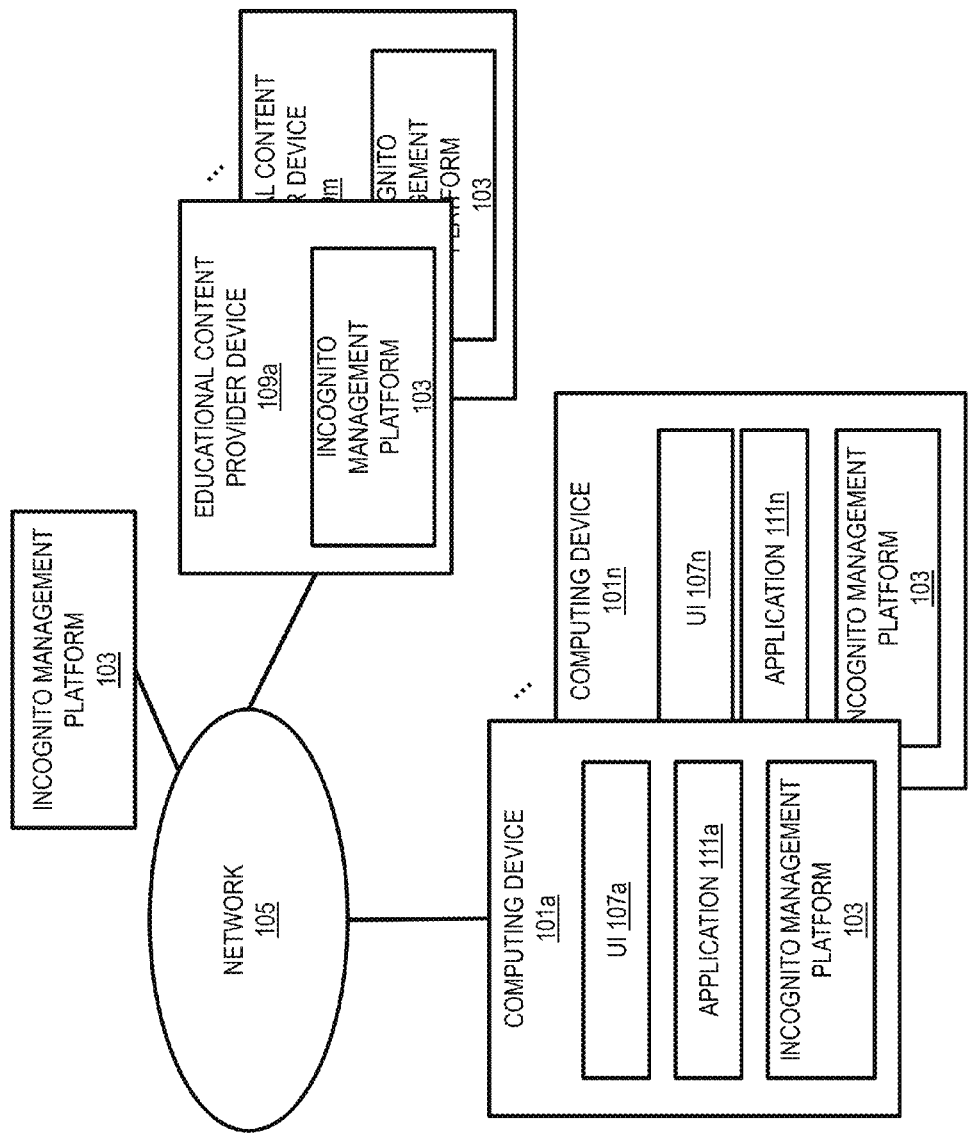
FIG. 1 illustrates an example network environment in which access to educational content in a private browsing mode is provided, according to an embodiment.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

Competency-based learning refers to a course, program, or an educational component of a course or program designed to focus on the mastery of student learning outcomes. The competency-based learning method can be used either alone as the only learning method or in combination with other learning methods such as, for example, credit hour learning, tutoring, traditional and online learning methods, etc. A competency-based course or program can be a course or program that uses competency-based learning alone or in combination with other learning methods. A competency-based program allows students to demonstrate mastery of specific skills and knowledge through a variety of assessments for a particular degree program including general education and a major. As a result, a competency-based program provides students and educational institutions with productivity and quality improvements.

However, a need exists for a user to access an educational account in a private access mode such that the user is able to observe and follow past activities of another user, for example the owner of the educational account, without leaving a footprint. For example, there is a need for a coach or an instructor to access a student's account and to be able to follow and recreate the student's learning activities to be able to understand any problems or difficulties that the student may have and provide advice to the student to improve his/her learning experience. In such circumstances, the coach can access the student account in a private access (incognito) mode such that the recreated actions by the coach are not stored in the student account.

Competency-based education (e.g., competency-based courses or programs) is not limited to physical classroom settings or instructions. The methodology behind competency-based education is focused on learning, and defines a user's (e.g., an student) learning by successful completion of skills or demonstration of knowledge regardless of how long a user works in a competency area. Competency-based education is a self-directed approach, which means that learners can complete various competency areas without temporal or geographic restrictions. A competency-based program can be designed to replace a traditional classroom setting where the focus is on how many hours, semesters, or years a user spends in school. Alternatively, competency-based programs can be designed and used in combination with traditional classroom-based education such that educational material can be de-constructed and re-constructed to provide better tracking of learning processes as well as ensuring that users can speed up or slow down to learn material needed to move forward in their academic progress.

In some instances, competency-based education can be designed and provided such that a user, herein referred to as an "incognito user", can access a learning user's account in a private browsing mode. In such instances, the activities of a learning user, while attending the competency-based education, can be collected and stored. Moreover, the incognito user associated with the learning user is provided access to the learning user's account and permitted to re-execute the learning user's activities to, for example, follow the learning user's learning process to find problems that may affect the learning process and provide the learning user with suggestions and solutions for a more efficient learning process. In such instances, however, the re-execution activities of the incognito user are not stored in the learning user's account.

FIG. 1 illustrates an example network environment in which access to educational content in a private browsing mode is provided, according to an embodiment. A network environment 100 includes computing devices 101a-101n and educational content provider devices 109a-109m. Computing devices 101a-101n and educational content provider devices 109a-109m can communicate with each other through a network 105. An educational content provider device 109a-109m can include one or more computing devices and one or more computer-readable storage devices (not shown).

Each of computing devices 101a-101n can represent various forms of processing devices. Example processing devices can include a desktop computer, a laptop computer, a hand-held computer, a personal digital assistant (PDA), a cellular telephone, a network appliance, a camera, a smart phone, an enhanced general packet radio service (EGPRS) mobile phone, a media player, a navigation device, an email device, a game console, or a combination of any these data processing devices or other data processing devices. Computing devices 101a-101n and educational content provider devices 109a-109m may be provided access to or receive application software executed or stored on any of the other computing devices 101a-101n or educational content provider devices 109a-109m.

The educational content provider devices 109a-109m may be any system or device having a processor, a memory, and communications capability for providing content to the computing devices 101a-101n. In some example aspects, an educational content provider device 109a-109m can be a single computing device, for example, a computer server. In other embodiments, an educational content provider device 109a-109m can represent more than one computing device working together to perform the actions of a server computer (e.g., cloud computing). Further, an educational content provider device 109a-109m can represent various forms of servers including, but not limited to a web server, an application server, a proxy server, a network server, or a server farm.

In some aspects, the computing devices 101a-101n may communicate wirelessly through a communication interface (not shown), which may include digital signal processing circuitry where necessary. The communication interface may provide for communications under various modes or protocols, for example, Global System for Mobile communication (GSM) voice calls, Short Message Service (SMS), Enhanced Messaging Service (EMS), or Multimedia Messaging Service (MMS) messaging, Code Division Multiple Access (CDMA), Time Division Multiple Access (TDMA), Personal Digital Cellular (PDC), Wideband Code Division Multiple Access (WCDMA), CDMA2000, or General Packet Radio System (GPRS), among others. For example, the communication may occur through a radio-frequency transceiver (not shown). In addition, short-range communication may occur, for example, using a Bluetooth, WiFi, or other such transceiver.

In some aspects, network environment 100 can be a distributed client/server system that spans one or more networks, for example, network 105. Network 105 can be a large computer network, for example, a local area network (LAN), wide area network (WAN), the Internet, a cellular network, or a combination thereof connecting any number of mobile clients, fixed clients, and servers. Further, the network 105 can include, but is not limited to, any one or more of the following network topologies, including a bus network, a star network, a ring network, a mesh network, a star-bus network, tree or hierarchical network, and the like. In some aspects, communication between each client (e.g., computing devices 101a-101n) and an educational content provider device 109a-109m can occur via a virtual private network (VPN), Secure Shell (SSH) tunnel, or other secure network connection. In some aspects, network 105 may further include a corporate network (e.g., intranet) and one or more wireless access points.

In example aspects, a user at any of computing devices 101a-101n can provide user input within an application 111a-111n (e.g., a web browser) on the computing device. The user input can specify which web content to download. For example, a user input can be a Uniform Resource Locator (URL) address associated with a website specifying web content to be downloaded from an educational content provider device 109a-109m. The user may also enter input to specify what part of a website the user wishes to see on a User Interface (UI) 107a-107n of the computing device 101a-101n.

In some aspects, an incognito management platform 103 can manage processes of providing access to educational content in private browsing mode to users of the computing devices 101a-101n. In various aspects, the incognito management platform 103 can be located in any location within network 100 and communicate with the educational content provider devices 109a-109m and with the computing devices 101a-101n via the communication network 105. In some example aspects, each of computing devices 101a-101n can include an incognito management platform 103, which can provide access to educational content in private browsing mode to a user of the computing device 101a-101n based on a profile of the user. In some other example aspects, components of the incognito management platform 103 can be located within an educational content provider device 109a-109m or be distributed in different locations within network 100.

Figure 2:
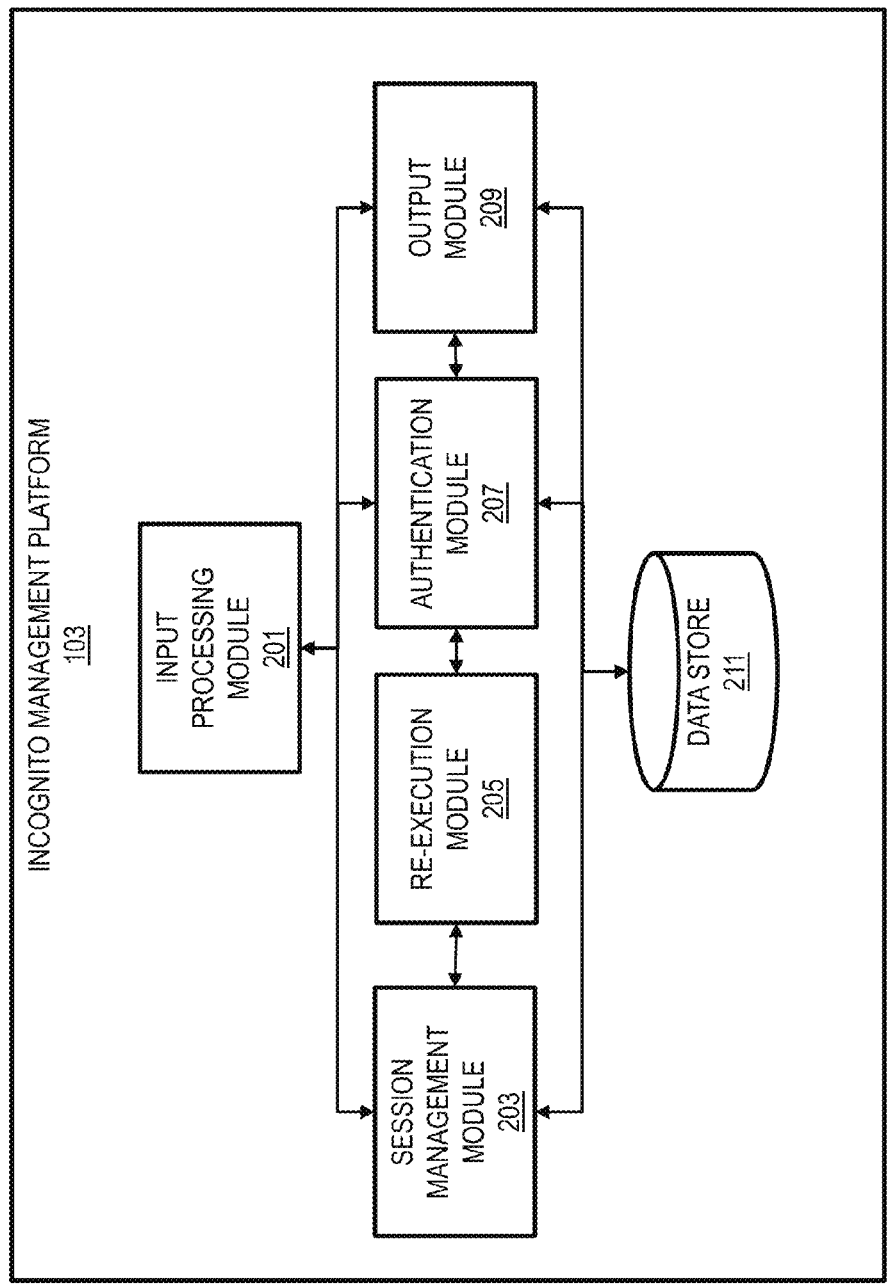
FIG. 2 is a schematic illustration of an incognito management platform, according to an embodiment.

FIG. 2 is a schematic illustration of an incognito management platform, according to an embodiment. Incognito management platform 103 can be similar to the incognito management platform 103 of FIG. 1. As shown in FIG. 2, an incognito management platform 103 can include an input processing module 201, a session management module 203, a re-execution module 205, an authentication module 207, an output module 209, and a data store 211.

As used herein, a module can be, for example, any assembly and/or set of operatively-coupled electrical components, and can include, for example, a memory, a processor, electrical traces, optical connectors, software (executing or to be executed in hardware) and/or the like. Furthermore, a module can be capable of performing one or more specific functions associated with the module, as discussed further below.

The incognito management platform 103 can provide access to educational content in private browsing mode to users of the computing devices 101a-101n. In some instances, the input processing module 201 can receive a request from a user, as an incognito user, for private browsing access to another user's (e.g., a learning user's) account. In some other instances, the input processing module 201 may receive a request from a learning user (e.g., a student) for assistance from an incognito user (e.g., a coach). The input processing module 201 may store the request in data store 211. In other instances, the request may be stored in a memory location of the content provider device 109a-109m (not shown in FIG. 1) and/or at a local memory location of the computing device 101a-101n (not shown in FIG. 1). The input processing module 201 may retrieve the request from the educational content provider device 109a-109m, the computing device 101a-101n, the data store 211, or a combination thereof.

In some instances, the authentication module 207 receives a credential associated with the incognito user in an incognito user profile, for example from data store 211. The credential associated with the incognito user is different from a credential associated with the learning user for accessing the learning user's account. For example, the incognito user credential may provide a limited access to the learning user's account to the incognito user. The limited access may enable the incognito user to re-execute the learning user's activities and/or introduce new activities within the learning user's account, without the activities of the incognito user being stored in the learning user's account and without these activities having any effect on the learning users account. The authentication module 207 verifies the incognito user's credential, and when the credential matches with the credential from the incognito user's profile, permits the incognito user to access the learning user's account.

In such instances, the session management module 203 can initiate a private browsing session to provide access to the educational account associated with the learning user of the educational content to the incognito user. The educational account of the learning user may include a set of stored actions by the learning user (e.g., the owner of the account) associated with the educational content. The set of stored actions may be a set of recent activities by the learning user and may be stored in data store 211. The incognito user may be a user associated with the learning user, for example, an administrator, an instructor, a mentor, a coach, or an advisor. In some instances, the association between the learning user and the incognito user may be pre-defined by the educational content provider device 109a-109m and stored in a storage of the educational content provider device 109a-109m or in data store 211.

In some instances, upon permitting the incognito user to access the learning user's account, the re-execution module 205 permits the incognito user to re-execute the set of user actions stored in data store 211 within the private browsing session initiated by the session management module 203. In addition, the session management module 203 may permit the incognito user to initiate new masquerading actions as the learning user and observe results of the actions. However, the re-execution module 205 does not store the re-executed actions and the masquerading actions in association with the learning user's account. In some instances, the session management module 203 may track and store actions of the incognito user in a separate storage location not associated with the learning user's account.

In some instances, the output module 209 receives one or more instructions associated with the re-executed set of user actions from the incognito user. For example, the one or more instructions may include at least one instruction to the learning user, guiding the user on how to use the educational content, provided to improve learning outcome or answering the initial question provided by the learning user. The output module 209 may provide the instruction to the learning user. In some instances, the instructions may include actions suggested to the user to apply when using the educational content. In other instances, the instructions may include instructions on how to provide the education content to the learning user to be provided to the educational content provider device 109a-109m. In such instances, the output module 209 may send such instructions to the educational content provider device 109a-109m. The output module 209 may also store the instructions in data store 211 for further access by the learning user, the incognito user or by the educational content provider device 109a-109m.

Figure 3:
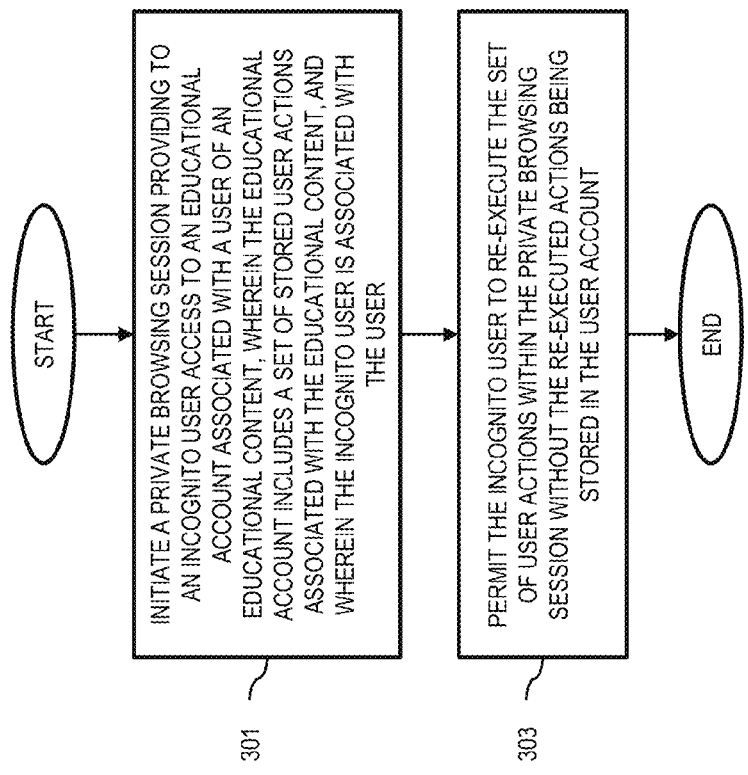
FIG. 3 is a flowchart of a process for providing access to educational content in a private browsing mode, according to an embodiment.

FIG. 3 is a flowchart of a process for providing access to educational content in a private browsing mode, according to an embodiment. Although FIG. 3 is described with reference to FIGS. 1 and 2, the subject technology is not limited to such and can apply to other computing devices and systems. At block 301, the session management module 203 initiates a private browsing session to provide to an incognito user of a computing device 101*a*-101*n* access to an educational account associated with a learning user of the educational content provided by the educational content provider device 109*a*-109*m*. In some instances, the initiation of the private browsing session by the session management module 203 may be based on a request from the learning user of the educational content provided by the educational content provider device 109*a*-109*m* and received by the input processing module 201 or a request from the incognito user associated with the learning user. For example, the learning user may be facing a difficulty with learning while using the educational content and may often ask for guidance from the incognito user. As another example, the incognito user may notice that the learning user has difficulty learning the educational content and decide to access the learning user's account in order to observe the learning user's activities and provide guidance to the user. The educational account of the learning user of a computing device 101*a*-101*n* includes a set of stored user actions associated with the educational content. The set of user actions may include reading, writing, answering questions, taking a test, listening to an audio file, watching a video file, communicating with other users, or a combination thereof. The set of actions may be determined based on a date, a date interval, a time interval, etc. In addition, the incognito user is associated with the user as an administrator, an instructor, a mentor, a coach, or an advisor.

At block 303, the re-execution module 205 permits the incognito user of a computing device 101*a*-101*n* to re-execute the set of user actions within the private browsing session initiated by the session management module 203, without the re-executed actions being stored in the user account. In some instances, providing access to the incognito user includes simulating for the incognito user an access by the learning user to the educational account. In such instances, the re-execution of the set of learning user's actions is a simulation of the actions within the private browsing session. Specifically, any actions by the incognito user do not cause recordation of analytical data that would have been otherwise recorded by actions of a user that owns the educational account (e.g., a student) moving through the session.

In some instances, the incognito management platform 103 provides access to a learning user's account to the incognito user based on a credential associated with the incognito user in an incognito user profile. For example, the incognito user may have a profile stored, by the educational content provider 109*a*-109*m* or by the input processing module 201, in data store 211. The profile may include credentials associated with the incognito user for accessing educational accounts of one or more learning users. The incognito user can be a privileged user such as an administrator, an instructor, a mentor, a coach, or an advisor, etc., and the incognito user profile of each incognito user may include a security token associated with the incognito user. For example, an instructor may be authorized by the educational content provider device 109*a*-109*m* to access accounts of a group of students who are signed up into a competency or a course taught by the instructor. The incognito user credentials are different from credentials associated with the learning users for accessing the user accounts. In addition, each incognito user may have a different credential and security code for accessing each learning user's account, or one credential for accessing a group of accounts, provided by the educational content provider device 109*a*-109*m* or by the incognito management platform 103. Each incognito user's profile determines level of access of the incognito user to each learning user's account.

In some instances, a group of incognito users may be associated with one learning user. In such instances, each incognito user from the group of incognito users may be permitted by the re-execution module 205 to re-execute a subset of the set of learning user actions based on the incognito user profile associated with each of the incognito users. For example, the level of access an instructor is permitted to have to a student's account may be different from the level of access an administrator or a teaching assistant is permitted to have.

In some instances, upon accessing the learning user's account within the private browsing session, the incognito user may provide instructions associated with the re-executed set of user actions. The instructions may include instructions to the user, to the educational content provider device 109*a*-109*m*, to other incognito users associated with the learning user, etc. The output module 209 receives the instructions, and provides the instructions to their relevant recipients such as, the learning user, other incognito users, the educational content provider device 109*a*-109*m*, etc. The output module 209 may store the instructions in data store 211.

In some instances, upon initiation of the private browsing session by the session management module 203, the session management module 203 deactivates analytics and metric collection functions associated with the user account. Therefore, no data collection is performed during the private browsing session. In such instances, upon receiving a request from the incognito user to end the private browsing session (for example when the incognito user logs off from the learning user's account) the session management module 203 reactivates the analytics and metric collection functions associated with the user account.

Figure 4:
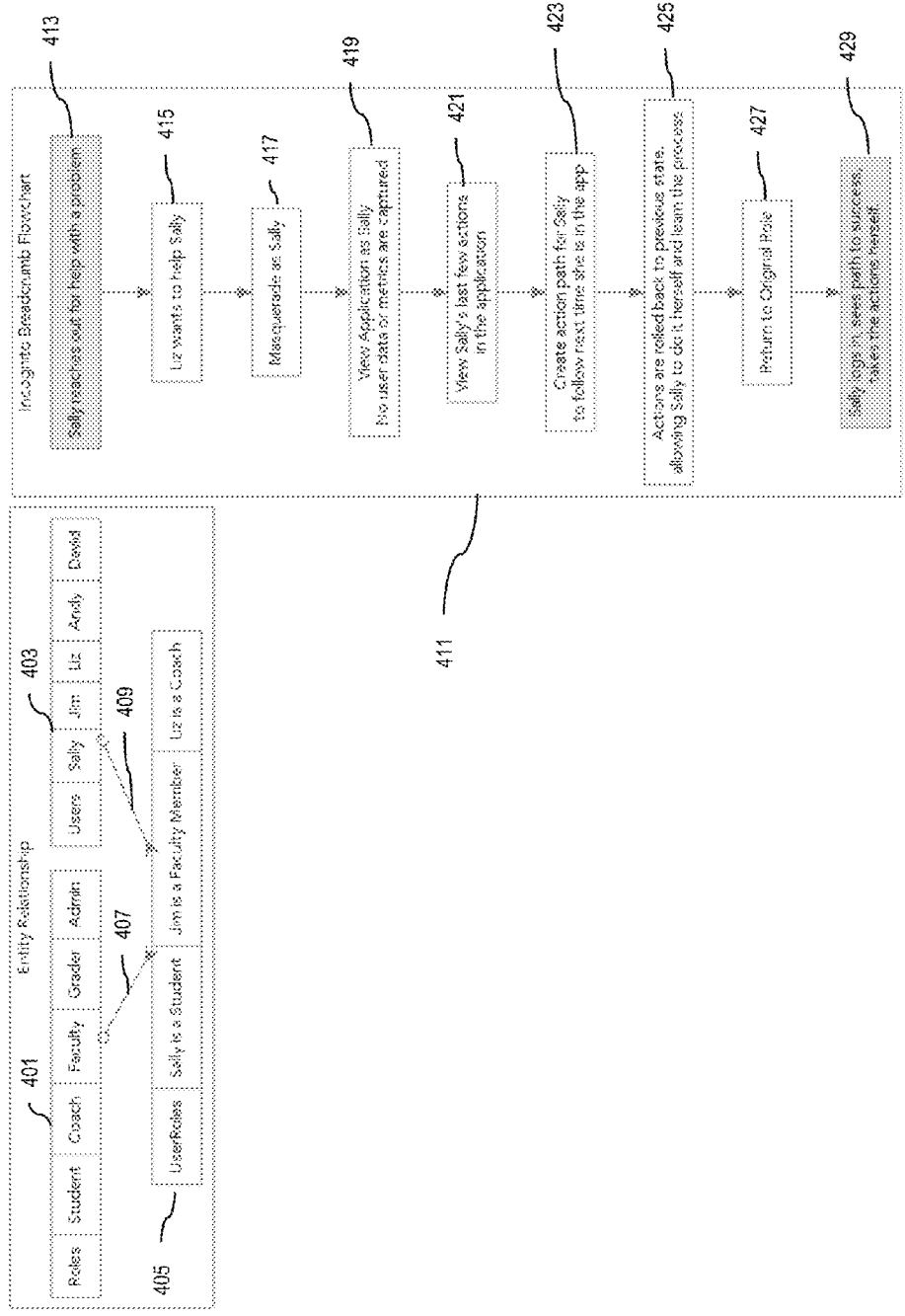
FIG. 4 is an exemplary flowchart of a process for providing access to educational content in a private browsing mode, according to an embodiment.

FIG. 4 is an exemplary flowchart of a process for providing access to educational content in a private browsing mode, according to an embodiment. Table 401 includes roles that can be associated with a user of an educational content provided by an educational content provider device 109*a*-109*m*. Each user in table 403 is associated with a role in table 403. Table 405 displays the association between the users. The tables 401, 403 and 405 may be stored in a memory location associated with the educational content provider device 109*a*-019*m* or in data store 211 of the incognito management platform 103. For example, Jim is a faculty member associated with Sally via arrow 409 and Sally is a student associated with a faculty (e.g., Jim) via arrow 407. In this example, Sally is a learning user and Jim is an incognito user. The flowchart 411 represents the process of providing private browsing session access to Sally's account to Jim by the incognito management platform 103. At block 401 Sally reaches out for help with a problem, for example by sending a request to the educational content provider device 109*a*-109*m*. The educational content provider device 109*a*-109*m* sends the request to the incognito management platform 103. The input processing module 201 receives the request and stores the request in data store 211.

In some instances, the input processing module 201 may send the request to one or more incognito users associated with Sally by tables 401, 403, and 405 such as, for example Liz who is a coach. At block 415 Liz decides to help Sally and requests access to Sally's account as an incognito user per block 417. Upon receiving Liz's request the session management module 203 initiates a private browsing session for Liz as previously discussed with regards to FIGS. 2 and 3. At block 419 Liz is permitted by the incognito management platform 103 to view the educational content provided to Sally by the educational content provider device 109*a*-109*m*, for example as an application, while no user data associated with Liz's access to Sally's account is captured. At 421 the re-execution module 205 permits Liz to view Sally's last actions of using the educational content and at 423 the re-execution module 205 permits Liz to create instructions for Sally as a path of actions for Sally to follow during her next study session using the educational content. The instructions may be stored in data store 211. At 425 any actions by Liz are rolled back, (e.g., removed from Sally's account) and at 427 the status of Sally's account is returned to its original role as a student's account. Finally, at 429, Sally logs into her account and can see and follow the action path provided to her by Liz.

Figure 5:
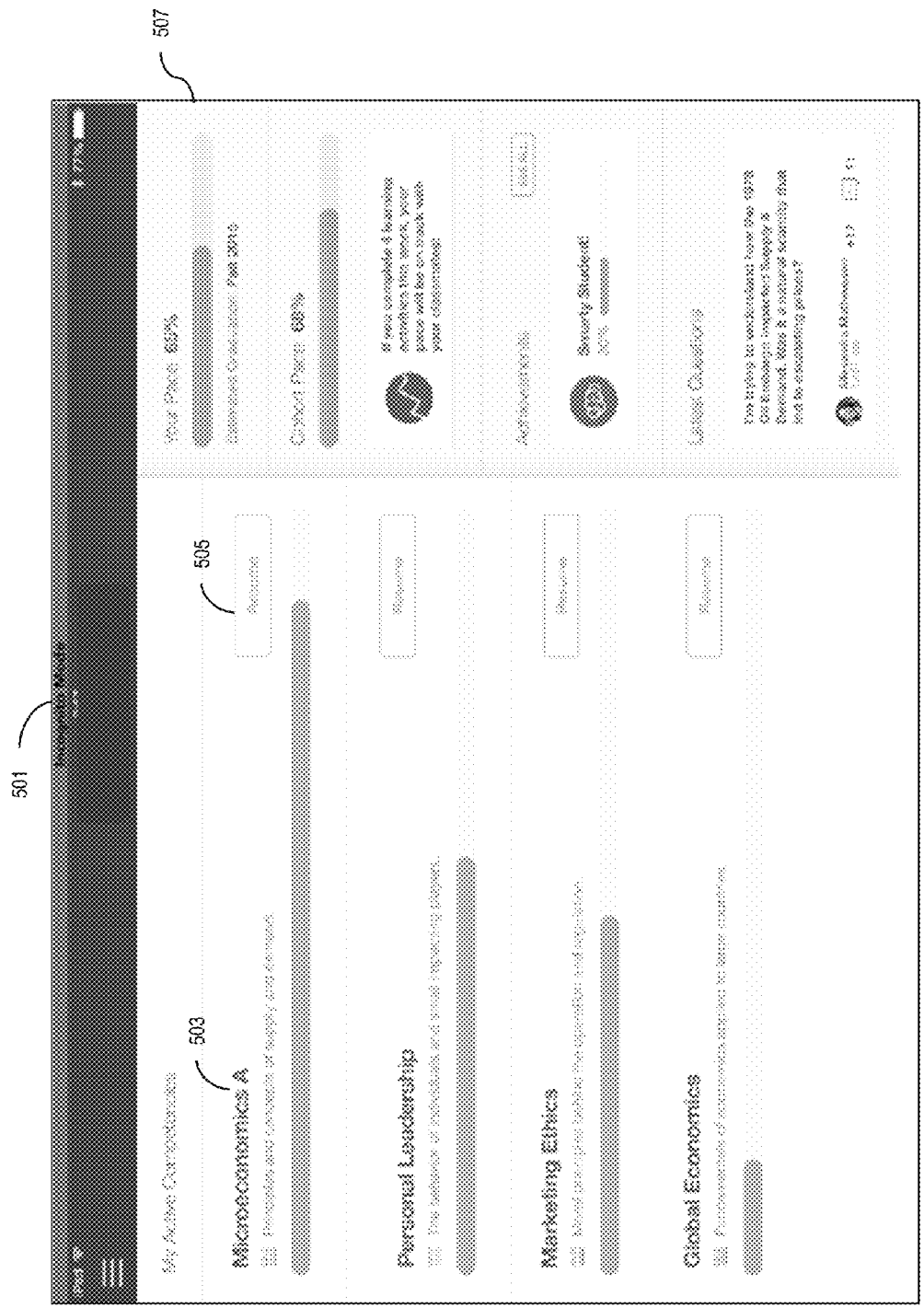
FIG. 5 is an exemplary screenshot of providing access to educational content in private browsing mode, according to an embodiment.

FIG. 5 is an exemplary screenshot of providing access to educational content in private browsing mode, according to an embodiment. FIG. 5 shows a snapshot of access to a session provided to an incognito user in private browsing mode. The session is associated with a learning user (e.g., a student) which is related to the incognito user (e.g. a coach). For example, the access may be provided by the incognito management platform 103 to the incognito user via a UI 107a-107n of a computing device 101a-101n associated with the incognito user. As shown in FIG. 5, a ribbon 501 titled "Incognito mode" indicates that this is not a regular session for a learning user. A list 503 of competencies of the learning user such as, for example, "Microeconomics A", "Personal Leadership", etc. is provided in the same way that it would have been provided to the learning user. The incognito user can walk through the learning user's activities, for example, by pressing on "resume" buttons 505. In addition, the window 507 on the right shows statistics related to the learning user's performance. However, the difference between the session shown in FIG. 5 and the educational session provided to the learning user is that actions by the incognito user in the session of FIG. 5 will not be recorded by the incognito management platform 103 or the educational content provider device 109a-109m.

Figure 6:
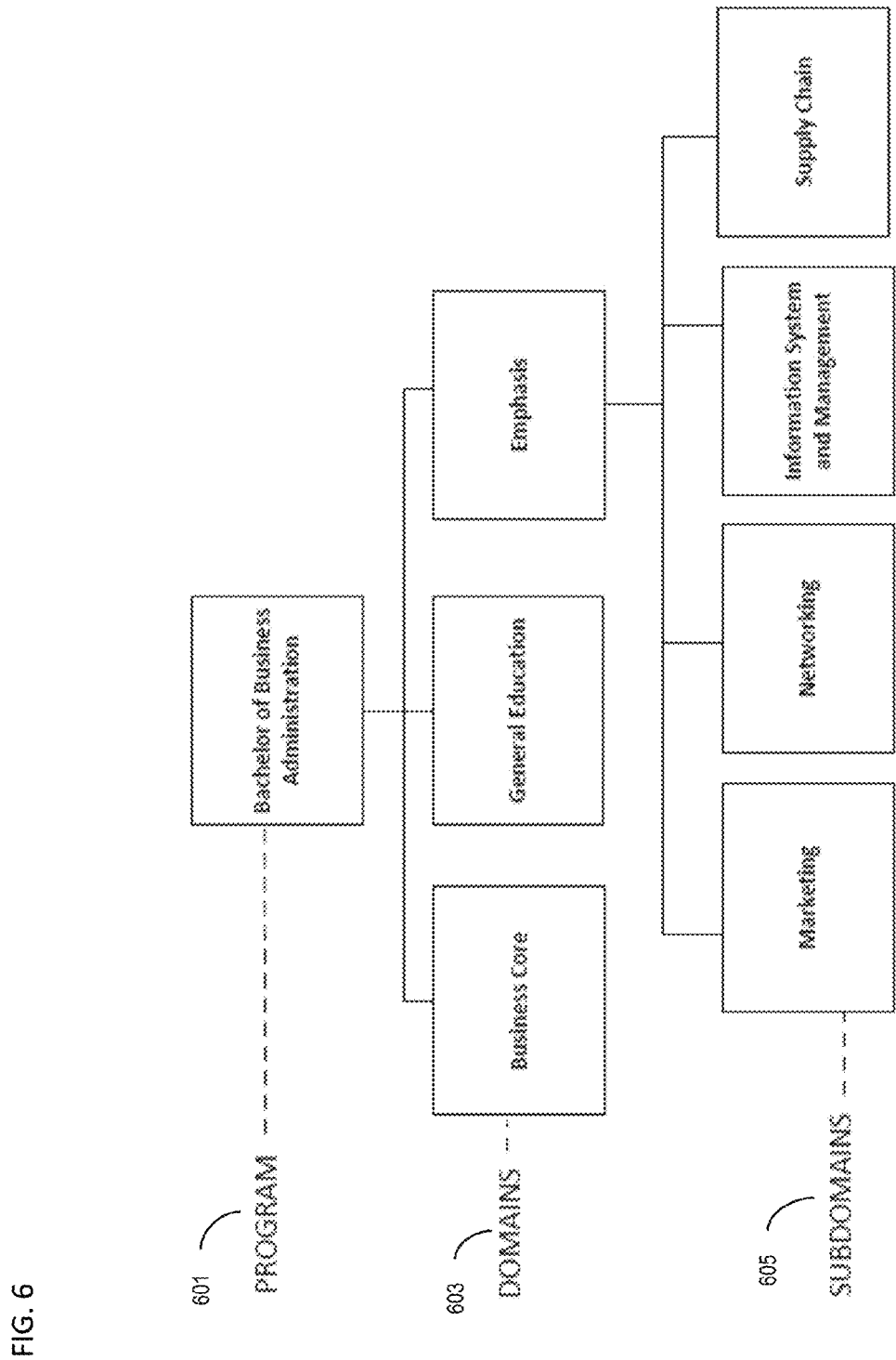
FIG. 6 is a diagram showing an exemplary hierarchy of a competency-based program, according to an embodiment.

FIG. 6 is a diagram showing an exemplary hierarchy of a competency-based program, according to an embodiment. In the example of FIG. 6, in a degree earning program 601 such as bachelor of business administration (BBA), competencies (or competency areas) and objectives for the competency-based program can be mapped as shown in FIG. 6. The competency areas are outlined in a blueprint organized by domains 603 and subdomains 605, and grouped into areas of emphasis. These are ordered such that the learning process occurs based upon prerequisites, levels of learning and contextualized learning concepts.

Figure 7:
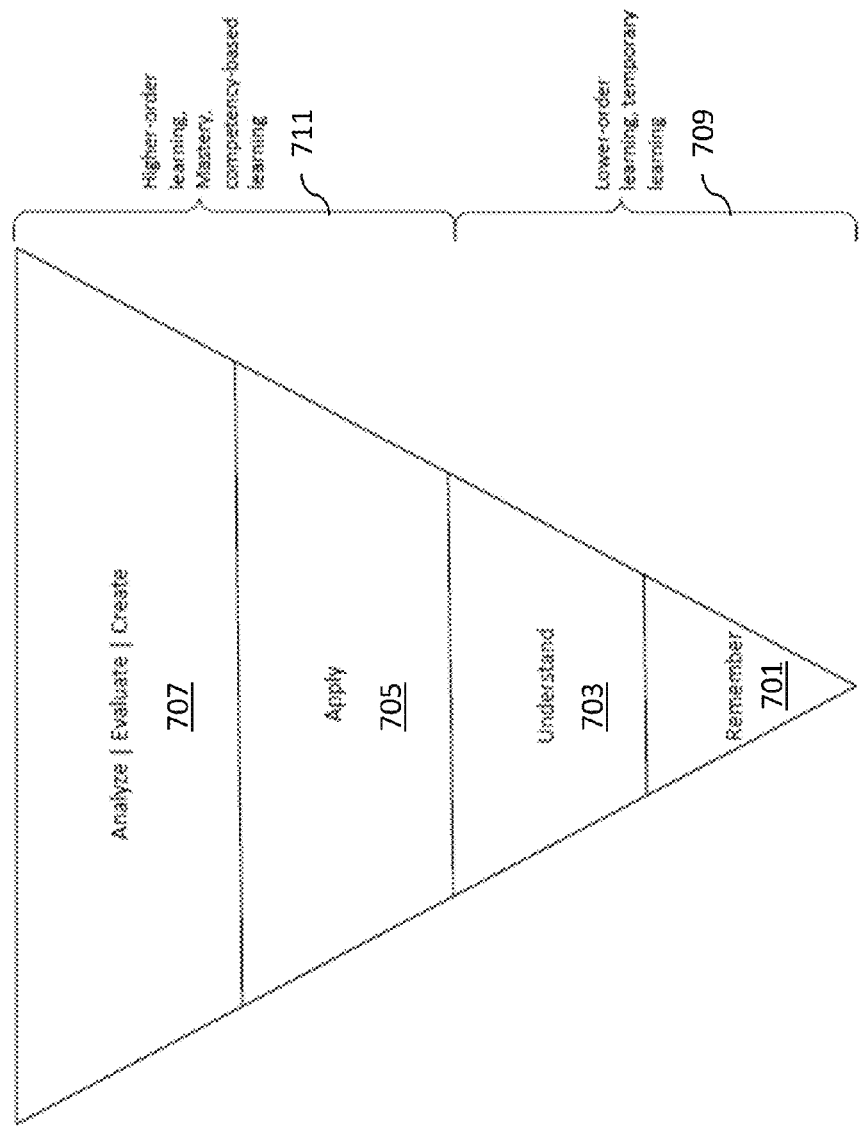
FIG. 7 is a diagram illustrating a learning experience of a user, according to an embodiment.

Competency areas can be developed to encourage higher-order thinking and real world application of skills and knowledge obtained. FIG. 6 illustrates a user's (e.g., a student) learning experience, which can be categorized into different subdomains 605, such as lower-order learning (temporal learning) and higher-order learning/mastery (competency-based learning). A user can progress through different stages of learning, as seen in FIG. 7, for example, remembering 701, understanding 703, application 705, and analyzing/evaluating/creating 707, to master a specific subject area. At the beginning, the user can remember and understand for temporal learning experience, shown as 709. But, as the user progress by applying learned concepts, analyzing, evaluating, and creating something else based on the learned concepts, via competency-based learning, the user can master the specific subject area shown as 711. A competency can also be defined as a statement describing the highest level of learning including knowledge, skills, and abilities which a user must accomplish for a specific content area.

Referring back to FIG. 6, a competency-based program for the BBA is divided into different domains 603 including Business Core, General Education, and Emphasis. The Emphasis includes subdomains 605, such as Management, Marketing, Information Systems Management, and Supply Chain. Each domain is broken down into subdomains as a way to categorize learning concepts. The subdomains are further divided into different competency areas, each of which is broken down into different learning objectives. That is, each competency includes a series of learning objectives including activities and a final assessment that gives users an opportunity to demonstrate mastery of a specific competency area.

Further, each competency area can be designated as a Level 1 or Level 2 competency. The classification of a Level 1 or Level 2 competency is determined based on the knowledge and skills needed to demonstrate mastery of a subject matter.

As noted earlier, each competency area is broken down into a set of learning objectives. A learning objective is defined herein to mean a measurable statement that describes what a user must be able to do to demonstrate a subset of knowledge, skills, and abilities that are necessary to successfully complete the competency area. Also, topics are subjects that are covered within a specific learning objective. The topics provide for more manageable chunks for users to study. Each topic is designed so that the topic can be completed by a user in a predetermined time (e.g., 30 minutes or an hour).

Level 1 competency is defined herein to mean an adaptive learning experience that guides users through the competency area based on what they may already know or how fast they learn new concepts. This means that each user may have a different learning path based on how they answer a series of questions, for example, "Checks for Understanding" (CFU). The final assessment within the Level 1 competency can be done using auto-graded (computer-graded) methods comprising objective questions answered from a set of multiple-choice questions by the users. Level 2 competency is defined herein to mean a self-guided learning experience where users are able to move freely through all learning materials. In the Level 2 competency, the assessments can be done by either self-graded or auto-graded methods, and in addition, a summative assessment can be done based on a project, which is manually graded based on a pre-defined rubric.

A user's competency in each competency area can be assessed using various types of assessments, for example, formative assessments (i.e., CFUs) or a summative assessment. Formative assessments are quick self-assessments per learning objective or topic within each competency area carried out during the learning experience of the users in order for the users to gauge their learning. Regardless of the level, the formative assessments can be auto-graded or self-graded. However, they are auto-graded when used to automatically guide the users through the learning activities such as in the Level 1 competency. A summative assessment is provided at the end of the competency to determine mastery of a subject area. In the exemplary embodiment, in the Level 1 competency, the summative assessment is auto-graded and, in the Level 2 competency, the summative assessment is manually graded.

Figure 8:
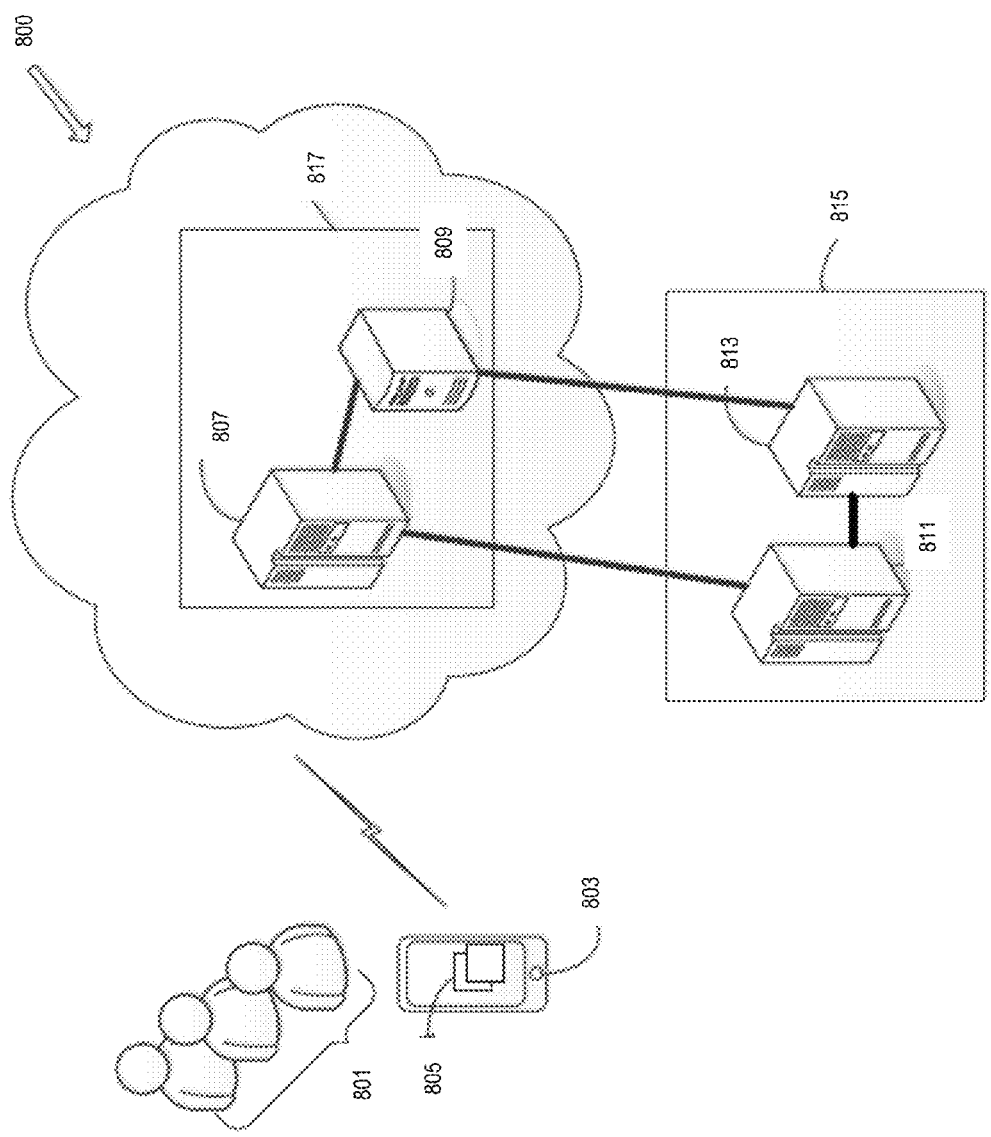
FIG. 8 is a high level, simplified diagram for an exemplary embodiment of an inventive concept.

FIG. 8 is a high level, simplified diagram for an exemplary embodiment of an inventive concept. FIG. 8 illustrates a high level network diagram of a competency-based learning system (CBLS) 800. In FIG. 8, the CBLS 800 includes one or more users 801, a computing device 803 (similar to the computing devices 101a-101n of FIG. 1) with various applications 805 (similar to applications 111a-111n of FIG. 1), an application server 807, a data warehouse 809, an authentication server 811, and a user information system (SIS) 813. In the example, the authentication server 811 and the SIS 813 are part of an educational institution 815. Alternatively, the authentication server 811 and the SIS 813 can be part of a third party system providing similar functionalities.

The one or more users 801 include students, faculty members (or coaches), graders, or administrators. In the exemplary embodiment, the faculty members are the instructors or coaches of record for specific competency-based learning courses. Each faculty member academically supports the students, as a teacher or a coach for a specific course, and answers questions while the students are working through their competency areas for the specific course. Also, a coach can be any faculty member who helps with advising the student users to ensure retention and sustain their motivation to complete the certificate or degree program in which they are enrolled. Graders are hired staff members who are assigned for grading student user submitted assignments and projects including Level 1 and Level 2 assessments for each competency area. The graders will be assigned to the student users by one or more administrators so that grading can be more objective and unbiased. The administrator includes one or more administrative staff members at the education institution having authorization to access and modify institutional data (e.g., course data, user information for the competency-based learning courses and programs). Alternatively, the administrator can be anyone who has authorization to access and modify institutional data (e.g., course data, user information for the competency-based learning courses and programs) on behalf of the education institution.

The user device 803 may include a mobile phone, a tablet, a notebook, a portable computing device, or the like. In the exemplary embodiment, the user device 803 is shown as a mobile device, such as a tablet and a smartphone, but it is not limited to those types of mobile devices and may include non-mobile computing devices.

In the exemplary embodiment, the authentication server 811 and the user information system 813 are shown as part of an educational institution 815 (i.e., a college or university).

The application server 807 is implemented in one or more computers for performing various functionalities of the disclosed competency-based learning system. The application server 807 is configured to communicate with the user device 803 regarding educational content of the one or more competency-based learning courses. For example, the application server 807 receives over a network 817 from the user device 803 credentials of the user 801 for authenticating the user 801 for access. The application server 807 is further configured to send information and materials including educational contents of the one or more competency-based learning courses over the network 817 to the user device 803. The application server 807 is further configured to receive user assessment data from the user device 803 relating to different competency areas. Further, the application server 807 is configured to provide various functions and tools for the users, such as a user flow, dashboards/analytics, calendars, reader/adaptive/discussion areas, manual assessments, collaboration, etc. Furthermore, the application server 807 may connect to one or more servers providing various assessment tools and virtual classroom tools (which are not shown). The assessment tools may include one or more platforms for a writing center, math center, or virtual lab for the use of users. The virtual classroom tools may include a tutoring/early warning dashboard, manual grading system, remote proctoring system, etc.

The data warehouse 809 includes at least data relating to one or more users who have registered in one or more competency-based learning courses at the educational institution 815. The data is used by the application server 807 for various aspects of the competency-based learning system, such as presenting to educational materials to the users, providing progress statistics, user competency information, etc., on the user device 803. The data includes user information, competency information, competency assignment, and competency status of the one or more users registered in the one or more competency-based learning courses. In the exemplary system, the user information includes a system role (e.g., a user), identification, contact, and personal information of the user. The competency information includes a competency identification (e.g., numerical identification of each competency area), competency name (e.g., a short title of a competency area), and descriptive information (e.g., a brief description of a competency area). The competency assignment includes information on one or more assignments for the user to complete. The competency status includes information on competency Level 1 and/or Level 2 mapped out to individual statuses for each registered user in the one or more courses.

The authentication server 813 (also known as an active directory of individuals associated with the educational institution) includes at least data relating to users who registered for one or more competency-based learning courses at the educational institution 815. The authentication server 813 also includes data relating to faculty members, coaches, administrators, graders, and other staff members who are authorized to access the CBLS 800 for competency-based programs at the educational institution 815. The authentication server 813 is configured to receive an authentication request from the application server 807 for authenticating and/or validating the user 801 (i.e., users, coaches, graders, administrators, etc.) and to send an authentication result to the application server 807 for the user 801. Also, the authentication server 813 is configured to communicate with the user information system 813 for exchanging and updating various data on authorized users 801.

In the example, the user information system 813 serves as a central database or data repository for user information and data at the educational institution 815. The user information system 813 is configured to store various data entities, such as user, competency, user-competency, learning objectives, topics, assessments, term, faculty-user, and competency status data entities. A data entity is defined herein to mean a type or group of data records that share the same attributes and can be visualized as tables with attributes as columns and records as rows. A unique identifier called a "primary key" defines each record in an entity. By way of example, in the exemplary embodiment, a user data entity includes a system role (e.g., user, faculty, coach, grader, etc.), identification, contact and personal information. A competency data entity includes competency identification (e.g., numerical identification of competency areas), name and descriptive information of each competency area. A user-competency data entity includes associations between user identifications and individual competencies by term. A learning objectives data entity includes a learning objective identification, name and descriptive information of a learning objective. A topics data entity includes a topic identification, name and descriptive information of a topic. An assessment data entity includes assessment identification, name and descriptive information of an assessment. A term data entity includes a term identification, name and descriptive information of a term. A faculty-user data entity includes a mapping between a faculty member and a user. A competency status data entity includes information on mappings of Level 1 and Level 2 competencies mapped to a status of an individual user.

As discussed above, the data warehouse 809 is configured to communicate with the user information system 813. The data warehouse 809 requests and receives data from the user information system 813 on a periodic basis. The data received by the data warehouse 809 is a snap-shot copy of various data entities stored in the user information system 813, such as user, competency, user-competency, learning objectives, topics, assessments, term, faculty-user, and competency status data entities. The user information system 813 sends the data as snap-shot data in the form of comma separated files at a scheduled time to ensure up-to-date synchronization of data between the educational institution 815 and the data warehouse 809 (which is described hereinafter "a snapshot process"). The snapshot process is used to achieve data integration by allowing necessary data to be transferred from the user information system 813 to the data warehouse 809 at a particular point in time. That is, snapshots are taken at predetermined times (e.g., every midnight) to create snapshot feed files from the user information system 813. The snapshot-based approach offers higher tolerance, but reduces synchronization because reports of relevant data are run at regularly scheduled times, for example, once a day. Snapshots are preferable to handle large batch volumes of data. Further, snapshots are divided into logical subsets using data source keys, and as a result some of the typical problems associated with bulky load processes can be eliminated.

The snapshot process can be implemented by the usage and management of data source keys. Data source keys are composed of alphanumeric strings (e.g., letters A-Z, numbers 0-9, periods and underscores, etc.) that facilitate different data types from a single and multiple data sources to be organized logically within a single operation. The snapshot process processes data based on the associated data source key. The process can be broken into simpler and separate operations to optimize system resources for performing the snapshot process. Further, the data source keys are created as needed and can be reused as needed to categorize and integrate required data from disparate systems into the data warehouse 809.

As discussed earlier, the snapshot process is a batch process used to process jobs that extract data from the education institution into the data warehouse 809. The data extracted is used to update the data warehouse 809 as comma separated files. In the example, the snapshot process is designed to extract a feed file and push the data into the data warehouse 809.

Additionally, in other implementations, data can be loaded into the application server 807 by the data warehouse 809 on a schedule predetermined and defined by business rules governing individual data elements. The frequency of data feeds can change over time for different entities as driven by business need. Some of the factors that need to be considered when determining the frequency of the data feed from the user information system 813 or the data warehouse 809 include: frequency of adding, modifying, and deleting data at the educational institution 815 or 813; urgency of data synchronization; system performance considerations; number of data entities to be fed from the educational institution 813 into database entities of the data warehouse 809. The data is fed into the data warehouse 809 to create entities, update records in the application server 807 in separate feed files. The snap-shot feed files can be comma separated values files that conform to industry standards (e.g., IMS standards). To accept multi byte information, files are in Unicode format. Unicode formatted files include the Byte Order Mark (BOM). If a BOM is not specified, the system reads it as ISO-8859-1. The supported formats include: UTF-8, UTF-16LE, UTF-16BE, and ISO-8859-1.

FIGS. 9 and 10 provide functional block diagram illustrations of general purpose computer hardware platforms. FIG. 9 illustrates a network or host computer platform, as may typically be used to implement a server. FIG. 10 depicts a computer with user interface elements, as may be used to implement a personal computer or other type of work station or terminal device, although the computer of FIG. 10 may also act as a server if appropriately programmed. It is believed that those skilled in the art are familiar with the structure, programming and general operation of such computer equipment and as a result the drawings should be self-explanatory.

A server, for example, includes a data communication interface for packet data communication. The server also includes a central processing unit (CPU), in the form of one or more processors, for executing program instructions. The server platform typically includes an internal communication bus, program storage and data storage for various data files to be processed and/or communicated by the server, although the server often receives programming and data via network communications. The hardware elements, operating systems and programming languages of such servers are conventional in nature, and it is presumed that those skilled in the art are adequately familiar therewith. Of course, the server functions may be implemented in a distributed fashion on a number of similar platforms, to distribute the processing load.

Hence, aspects of the disclosed techniques relating to the competency-based learning system outlined above may be embodied in programming. Program aspects of the technology may be thought of as "products" or "articles of manufacture" typically in the form of executable code and/or associated data that is carried on or embodied in a type of machine readable medium. Storage type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the competency-based learning system into one or more computer platforms that will operate as components of the competency-based learning system in a remote distributed computing environment. Alternatively, the host computer (e.g., an application server) of the competency-based learning system can download and install the presentation component or functionality (including a graphical user interface on a user device) into a wireless computing device which is configured to communicate with the host computer on a network. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible storage media, terms such as computer or machine readable medium refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the techniques in this disclosure. Volatile storage media include dynamic memory, such as main memory of such a computer platform. Tangible transmission media include coaxial cables, copper wire, and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media therefore include, for example, a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

While the above discussion primarily refers to processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

Many of the above described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions.

In this specification, the term "software" is meant to include firmware residing in read-only memory or applications stored in magnetic storage, which can be read into memory for processing by a processor. Also, in some implementations, multiple software operations can be implemented as sub-parts of a larger program while remaining distinct software operations. In some implementations, multiple software operations can also be implemented as separate programs. Finally, any combination of separate programs that together implement a software invention described herein is within the scope of the invention. In some implementations, the software programs, when installed to operate on one or more electronic systems, define one or more specific machine implementations that execute and perform the operations of the software programs.

A computer program (also known as a program, software, software application, script, application, or code) can be written in any form of programming language, including compiled or interpreted language, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

It is understood that any specific order or hierarchy of steps in the processes disclosed herein is an illustration of exemplary approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components in the examples described above should not be understood as requiring such separation in all examples, and it should be understood that the described program components and systems can generally be integrated together in a single software product or packaged into multiple software products.

The embodiments described hereinabove are further intended to explain and enable others skilled in the art to utilize the invention in such, or other, embodiments and with the various modifications required by the particular applications or uses of the invention. Accordingly, the description is not intended to limit the invention to the form disclosed herein.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow are approximate, not exact. They are intended to have a reasonable range that is consistent with the functions to which they relate and with what is customary in the art to which they pertain.

The scope of protection is limited solely by the claims that now follow. The scope is intended and should be interpreted to be as broad as consistent with the ordinary meaning of the language that is used in the claims when interpreted in light of this specification and the prosecution history that follows and to encompass all structural and functions equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not without further constraints, preclude the existence of additional identical elements in the process, method, article, or apparatus that comprises the element.

The Abstract of the Disclosure is provided to allow the reader to quickly ascertain the nature of the technical disclosure. It is submitted that the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more feature than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A system for providing access to educational content in a private browsing mode, the system comprising:
   a memory comprising instructions; and
   a computer processor configured to execute the instructions to:
   initiate a private browsing session providing an incognito user with access to a user account of a learning user via a credential that includes a security code associated with the incognito user in an incognito user profile, the incognito user being different than the learning user and the credential associated with the incognito user being different than a credential associated with the learning user for accessing the user account,
   wherein the user account of the learning user comprises a set of stored user actions associated with the educational content previously performed by the learning user;
   deactivate an analytics and metric collection function associated with the user account of the learning user after the initiation of the private browsing session;
   permit the incognito user to re-execute at least a subset of the set of stored user actions within the private browsing session without the re-executed actions being stored in the user account of the learning user; and
   reactivate the analytics and metric collection function associated with the user account of the learning user after receiving a request from the incognito user to end the private browsing session.

2. The system of claim 1, wherein the processor is further configured to:
   receive one or more instructions associated with the re-executed at least a subset of the set of stored user actions from the incognito user, wherein the one or more instructions comprise at least one instruction to the learning user; and
   provide the at least one instruction to the learning user, via the user account.

3. The system of claim 1, wherein the processor is further configured to:
   receive one or more instructions associated with the re-executed at least a subset of the set of stored user actions from the incognito user, wherein the one or more instructions comprise at least one instruction to a provider of the educational content; and
   provide the at least one instruction to the provider.

4. The system of claim 1, wherein the initiation of the private browsing session is based on a request from the learning user of the educational content or a request from the incognito user associated with the learning user.

5. The system of claim 1, wherein the stored set of user actions comprises reading, writing, answering questions, taking a test, listening to an audio file, watching a video file, communicating with other users, or a combination thereof.

6. The system of claim 1, wherein the providing access to the incognito user comprises simulating for the incognito user an access by the learning user to the user account, wherein the simulating comprises the re-execution of the at least a subset of the stored set of user actions.

7. The system of claim 1, wherein the incognito user is a privileged user comprising at least one of an administrator, an instructor, a mentor, a coach, or an advisor.

8. The system of claim 1, wherein the incognito user is provided access to a plurality of user accounts of a plurality of learning users via the credential associated with the incognito user.

9. The system of claim 1, wherein the incognito user has a plurality of credentials, and wherein each credential from the plurality of credentials provides access to the user account of a learning user from a plurality of learning users.

10. A computer-implemented method for providing access to educational content in a private browsing mode, the method comprising:
    initiating a private browsing session providing an incognito user with access to a user account of a learning user via a credential that includes a security code associated with the incognito user in an incognito user profile, the incognito user being different than the learning user and the credential associated with the incognito user being different than a credential associated with the learning user for accessing the user account,
    wherein the user account of the learning user comprises a set of stored user actions associated with the educational content previously performed by the learning user;
    deactivating an analytics and metric collection function associated with the user account of the learning user upon the initiation of the private browsing session;
    permitting the incognito user to re-execute at least a subset of the stored set of user actions within the private browsing session without the re-executed actions being stored in the user account of the learning user; and
    reactivating the analytics and metric collection function associated with the user account of the learning user after receiving a request from the incognito user to end the private browsing session.

11. The computer-implemented method of claim 10, further comprising:
    receiving one or more instructions associated with the re-executed at least a subset of the set of stored user actions from the incognito user, wherein the one or more instructions comprise at least one instruction to the learning user; and
    providing the at least one instruction to the learning user, via the user account.

12. The computer-implemented method of claim 10, further comprising:
    receiving one or more instructions associated with the re-executed at least a subset of the set of stored user actions from the incognito user, wherein the one or more instructions comprise at least one instruction to a provider of the educational content; and
    providing the at least one instruction to the provider.

13. The computer-implemented method of claim 10, wherein the initiation of the private browsing session is based on a request from the learning user of the educational content or a request from the incognito user associated with the learning user.

14. The computer-implemented method of claim 10, wherein the stored set of user actions comprises reading, writing, answering questions, taking a test, listening to an audio file, watching a video file, communicating with other users, or a combination thereof.

15. The computer-implemented method of claim 10, wherein the providing access to the incognito user comprises simulating for the incognito user an access by the learning user to the user account, wherein the simulating comprises there-execution of the at least a subset of the stored set of user actions.

16. The computer-implemented method of claim 10, wherein the incognito user is a privileged user comprising at least one of an administrator, an instructor, a mentor, a coach, or an advisor, and wherein the incognito user profile comprises a security token associated with the incognito user.

17. A non-transitory computer-readable medium comprising instructions stored therein for providing access to educational content in a private browsing mode, the instructions when executed by a system, cause the system to perform operations comprising:

initiating a private browsing session providing an incognito user with access to a user account of a learning user via a credential that includes a security code associated with the incognito user in an incognito user profile, the incognito user being different than the learning user and the credential associated with the incognito user being different than a credential associated with the learning user for accessing the user account, wherein the user account of the learning user comprises a set of stored user actions associated with the educational content previously performed by the learning user;

deactivating an analytics and metric collection function associated with the user account of the learning user upon the initiation of the private browsing session;

permitting the incognito user to re-execute at least a subset of the stored set of user actions within the private browsing session without the re-executed actions being stored in the user account of the learning user; and reactivating the analytics and metric collection function associated with the user account of the learning user after receiving a request from the incognito user to end the private browsing session.

\* \* \* \* \*